United States Patent [19]
Blise et al.

[11] 3,981,194
[45] Sept. 21, 1976

[54] FLOW METER SYSTEM

[75] Inventors: Bernard G. Blise; Norman H. Jessen, both of Kenosha, Wis.

[73] Assignee: William O. Lehman, Kenosha, Wis.; a part interest

[22] Filed: Aug. 21, 1975

[21] Appl. No.: 606,463

[52] U.S. Cl. .................................. 73/229; 73/253
[51] Int. Cl.² ........................................ G01F 1/075
[58] Field of Search .................... 73/229, 231, 253

[56] References Cited
UNITED STATES PATENTS

| | | | |
|---|---|---|---|
| 3,101,615 | 8/1963 | Pavone | 73/231 |
| 3,177,711 | 4/1965 | Ham et al. | 73/231 |
| 3,329,021 | 7/1967 | Quesinberry et al. | 73/229 |
| 3,455,162 | 7/1969 | Michener | 73/231 |
| 3,523,455 | 8/1970 | Branitzky | 73/258 |
| 3,531,988 | 10/1970 | Casani et al. | 73/187 |
| 3,623,835 | 11/1971 | Boyd | 73/231 |
| 3,866,469 | 2/1975 | Wemyss | 73/229 |
| 3,867,840 | 2/1975 | Baatz | 73/229 |

*Primary Examiner*—Herbert Goldstein
*Attorney, Agent, or Firm*—Arthur J. Hansmann

[57] ABSTRACT

A flow meter system having the components of a meter with a housing and a rotator and a sensor thereon, and an electronic digital counter and an electric timer are connected with the sensor, all for determining the quantity of flow of fluid through the meter. The sensor is a radio frequency type and the rotor has a metallic piece which disturbs the radio wave in effecting the counting of the revolutions of the rotor.

5 Claims, 2 Drawing Figures

FLOW METER SYSTEM

This invention relates to a flow meter system, and, more particularly, it relates to components which are useful in determining the rate of flow of a fluid in an installation.

BACKGROUND OF THE INVENTION

The prior art is already aware of many different systems and components for use in determining the quantity of flow of fluid in various installations. That is, it is common practice to provide a meter which has a rotor responsive to the flow of the fluid past the rotor, and there is commonly provided a type of detector or sensor which senses the revolutions of the rotor, all for determining the quantity of fluid passing through the system. Examples of such prior art are found in U.S. Pat. Nos. 3,866,469 and 3,636,767. However, those prior art systems are complicated and expensive in their various components, and, more particularly, they do not utilize the principles employed in the present invention and especially with regard to utilizing radio frequency waves for the purpose of detecting the revolutions of a rotor and thus the quantity of fluid flowing through the meter. Accordingly, it is an object of this invention to achieve the aforementioned advantages and to particularly do so with system components which are readily available and inexpensively provided and which operate in a reliable and accurate manner for determining the quantity of flow of fluid through the meter.

More specifically, it is an object of this invention to provide a system which utilizes a meter having a housing and a rotor, both of which are made of inexpensive plastic material, and to have a radio frequency sensor which can be attached to the meter housing and to have the rotor support a metal piece, such as a staple, which disturbs the radio frequency wave and thus determines the revolutions of the rotor and therefore controls the quantity of fluid flowing through the meter.

Still further, it is an object and advantage of this invention to provide a flow meter system which will have a wide range of capacity so that it can show low flow and high flow rates of fluid flowing through the system, and will be accurate in all quantities of flow and through the wide range mentioned. Still further, the system of this invention will operate on either a gas or a liquid flowing therethrough for the purpose of measuring the quantity or rate of flow of the gas or liquid. Also, the fluid flow system of this invention can be safely used for measuring the flow of combustible gases or liquids.

Other objects and advantages will become apparent upon reading the following description in light of the accompanying drawings.

DETAILED DESCRIPTION OF THE PREFERRED EMBODIMENT

Figure 1:
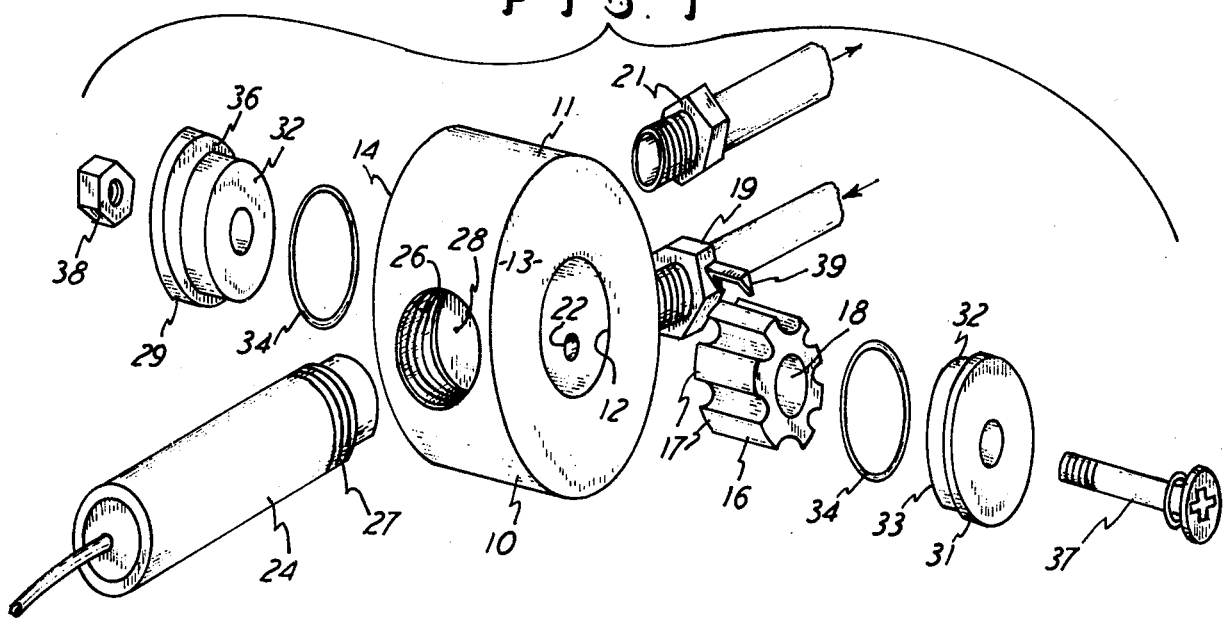
FIG. 1 is an exploded perspective view of the parts of the flow meter itself and which is employed in this system.

FIG. 1 shows the flow meter itself to include a cylindrically-shaped housing 10 having an outer circumference 11 and an inner circular bore 12 which extends between the opposite faces 13 and 14 and which is of one diameter through the housing 10 and extending end-to-end therethrough. The housing 10 may be made of an extruded plastic so that it can be conveniently and easily provided, and it need not have close tolerances or the like but yet would be highly efficient and can be made fluid-tight with the elements described hereinafter.

A rotor 16 can be rotatably disposed within the bore 12 and it has a plurality of radially-extending vanes 17 and a central opening 18 which extends axially through the rotor 16. Every two vanes 17 are separated by the openings shown therebetween, and those openings are reliefs in the circumference of the rotor 16. Thus the rotor 16 is of an outer diameter which is substantially the same as that of the bore 12, and the rotor 16 is of course therefore snugly rotatable in the bore 12. A fluid inlet fitting 19 and a fluid outlet fitting 21 are threadedly connected with the housing 10 and they are in fluid-flow communication with openings 22 and 23, respectively, in the housing 10. Thus, with the fittings 19 and 21 threaded into the housing 10, fluid can be introduced into the bore 12 and can be exhausted therefrom, and, in the process, the fluid passing around the bore 12 as described will induce rotation in the rotor 16. The rotor 16 is also made of a plastic material, and it is lightweight and therefore readily rotates in the housing bore 12 and does so in direct proportion to the flow of fluid through the housing 10, as described and indicated.

A radio frequency sensor 24 is attached to the housing 10 by threading into a threaded blind hole 26 extending radially in the housing 10, and thus the sensor 24 has threads 27, and the blind hole 26 has an end wall 28 which is spaced from the bore or chamber 12 and therefore does not open into the chamber 12. The radio frequency sensor is a standard component available on the market and may be one such as that made by Namco Controls, a division of Acme Cleveland Corporation of Cleveland, Ohio and it may be sensor model no. EE510-20000.

Also attached to the housing 10 are two end caps or covers 29 and 31 which are circular in shape and each of which has a cylindrical projection 32 which extends into the housing bore 12 for a short distance and presents an end wall 33 for flanking the respective end of the rotor 16. Also, O-rings 34 extend around the bosses 32 and against the shoulders 36 of the caps 29 and 31, and then a bolt or axial 37 can extend through the caps and the housing 10 and the rotor 16 to thus clamp the caps 29 and 31 against the housing ends 13 and 14 and thereby make the meter shown in FIG. 1 to be fluid tight. Of course a nut 38 secures the bolt 37 sufficiently tight to create the fluid tightness described.

Figure 2:
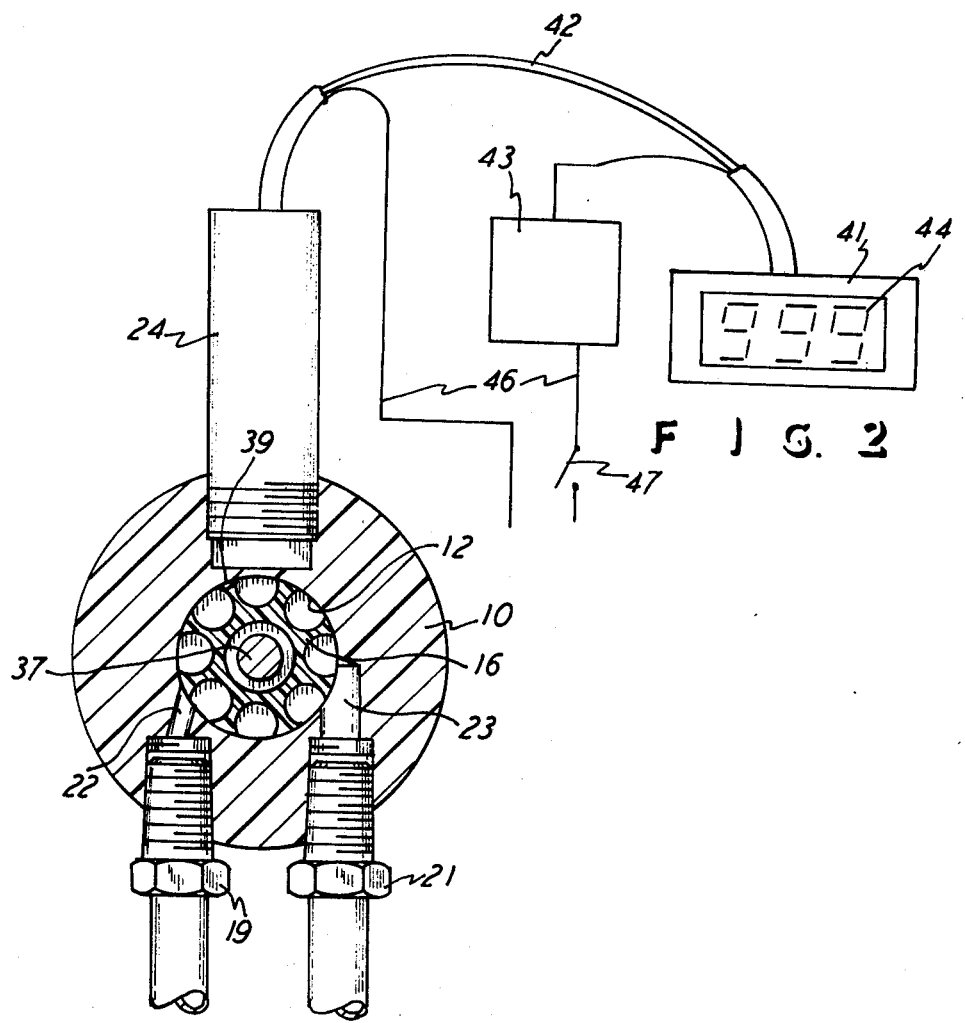
FIG. 2 is a sectional view of the assembled flow meter shown in FIG. 1 and with the other components shown electrically connected therewith.

With the construction of the meter as shown in FIGS. 1 and 2, the housing 10 and rotor 16 are made of a plastic material, and the caps 29 and 31 are also made of plastic. The method of making the meter unit itself is thus shown and described and the housing 10 can be made from an extruded tube which is cut to length at the walls or ends 13 and 14, and the rotor 16 can be machined from a cylindrical plastic piece, to render the rotor 16 in the cylindrical shape shown, and the same is true of the end caps 29 and 31. Then, the entire unit can be assembled by positioning the rotor 16 within the bore 12 and then placing the end caps 29 and 31 at opposite ends of the housing 10 and utilizing and positioning the O-rings 34 and finally placing the bolt 37 through the pieces, as mentioned, and tightening with the nut 38.

The sensor 24 thus produces a radio frequency wave, and that wave is disturbed by a metalic piece 39 which is embedded in the rotor 16. The piece 39 is shown to be a staple which can be forced into the periphery of one of the rotor vanes 17, and the piece 39 thus will rotate past the sensor 24 and disturb the radio wave emitted by the sensor 24, and that disturbance can be detected by a counter 41 which is an electronic counter connected by means of wires 42 with the sensor 24, in a conventional connection. Also, an electric timer 43 is connected with the counter 41 and thus a certain length of time can pass while the counter 41 is operative or energized, and, when the timer 43 is then opened or shut off, then the counter 41 will stop and whatever numbers register on the digital face 44 of the counter 41 will be significant in determining and disclosing the flow of fluid through the meter itself. Also, FIG. 2 shows that electric wires 46 connect with the sensor 24 and timer 43, and a switch 47 can be disposed in the line for manual starting and stopping of the entire system, all in a conventional electrical arrangement. Thus, the timer 43 may be of the type made by the Eagle Company of Baraboo, Wisconsin and can be their model no. BR41OA6, and the digital counter 41 can be of the type made by the Durant Corporation of Watertown, Wisconsin and can be their model no. 43000-811. Thus the sensor 24 creates a radio frequency signal which projects a sensing field in front of its face and toward the chamber 12. The metal piece or staple 39 changes the sensor impedance and this activates the sensors output circuit to supply an electronic output to the counter 41.

With this arrangement, a flow meter system is arranged wherein an accurate measurement of the flow of either gas or liquid through the housing 10 can be obtained, and the digital recorder 41 will provide a readout for the quantity of flow, as desired.

What is claimed is:

1. A flow meter system comprising a housing having a fluid inlet and a fluid outlet and a circular chamber in flow communication with said inlet and said outlet, a cylindrically-shaped rotor rotatably disposed in said chamber and being capable of rotation in response to the flow of fluid through said housing and with said rotor having a plurality of openings spaced around the circumference thereof and having vanes projecting radially between said openings and having an axial opening extending therethrough, said housing and said rotor being non-metalic, end covers on said housing, and a bolt of a diameter having clearance with said rotor axial opening and extending into said housing and loosely through said rotor axial opening for securing said end covers fluid-tightly to said housing, a metalic piece attached to one of said vanes of said rotor and being disposed at the periphery thereof, a radio frequency sensor mounted on said housing and extending to a location adjacent said chamber for sensing the passing of said metalic piece during rotation of said rotor in the disturbance of the radio wave emitted by said sensor, and a counter connected with said sensor for recording the wave disturbances and thus the revolutions of said rotor to thereby determine the flow of fluid through said housing.

2. The flow meter system as claimed in claim 1, including an electronic counter electrically connected with said sensor and being responsive to the disturbance of the radio wave for recording the revolutions of said rotor.

3. The flow meter system as claimed in claim 1, wherein said housing is cylindrically shaped and has a blind hole extending radially therein for receiving said sensor, and said housing and said rotor both being of a plastic material.

4. The flow meter system as claimed in claim 3, wherein said metalic piece is a staple embedded in said rotor.

5. The flow meter system as claimed in claim 1, including an electronic counter electrically connected with said sensor and being responsive to the disturbance of the radio wave for recording the revolutions of said rotor, and an electric timer connected with said counter for controlling the length of time said counter is being energized.

* * * * *